United States Patent Office 3,048,488
Patented Aug. 7, 1962

3,048,488
SYNTHETIC ORGANIC CHEMICAL
PRESERVATIVE FOR BEER
Frede B. Strandskov, Verona, and John B. Bockelmann, Tenafly, N.J., and Vincent J. Carroll, Williston Park, N.Y., assignors to The F. & M. Shaefer Brewing Company, Brooklyn, N.Y.
No Drawing. Filed Nov. 30, 1959, Ser. No. 856,025
16 Claims. (Cl. 99—48)

The present invention relates generally to the control of micro-biological growth in finished packaged beer and ale with a synthetic organic chemical preservative of the general formula:

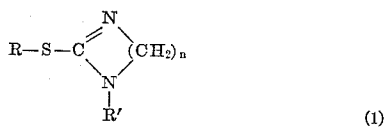

wherein R is 2-pyridyl-N-oxide or 2-quinolyl-N-oxide; $n$ is either of the integers two, three or four, and R' is hydrogen or an alkyl group containing up to four carbon atoms. The preservatives also include the acid addition salts of the compounds corresponding to the above formula. More particularly this invention is directed to preserving finished beer with 2-(1'-oxy-2'-pyridylthio)-imidazoline hydrobromide which corresponds to the formula:

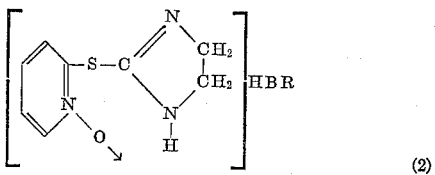

This latter compound is also known as 2-(2'-imidazolinyl-mercapto)-pyridine-N-oxide hydrobromide. Synthetic organic chemical preservatives of Formula 1 are very effective; they are both fungistatic and bacteriostatic and their acid addition salts are water-soluble. Compounds corresponding to Formula 1 therefore inhibit both the bacterial and the yeast growth in beer and ale and do not have to be used in combination with any other agent. This invention also relates to the finished product. All references to beer in the following disclosure apply equally well to ale.

The micro-biological spoilage of beer is a recognized problem (Kato, S., Nishikawa, N., and Munekata, H., "Bulletin of Brewing Science," published by The Brewing Scientific Research Institute, Tokyo, Japan, vol. 3, page 52, 1957). This is overcome by pasteurization of bottled and canned beer at the present time. Draught beer is not pasteurized and often spoils during the warm weather when left un-refrigerated. Said spoilage is readily observed by a marked amount of sediment in the beer and the unpleasant taste and odor produced by the microbial growth and metabolism.

Pasteurization of beer is a very costly and unpleasant operation. A typical modern pasteurizer for instance occupies approximately 900 square feet of floor space. The volume of steam used is large and the high humidity caused by all the steam and hot water results in almost impossible working conditions during the hot summer months.

A further disadvantage of pasteurization is the temperature of the beer when it comes out of the pasteurizer. Although attempts are made to cool the beer, it is difficult to get the temperature below 90° F. Beer at this temperature ages rapidly and develops the undesirable age taste. Preservation with a synthetic organic chemical compound is accomplished without heat, allowing the beer to be packaged and shipped at about 32° F.; at this temperature practically no aging takes place. A further advantage of preservation with a chemical compound over that with pasteurization is the elimination of a considerable amount of bottle breakage and resulting loss of beer due to pressure generated in the bottle by high temperature. This loss amounts to as much as 0.5% of the total production.

In the preservation of beer with chemicals, it is appreciated that residual micro-organisms contained in said beer may and usually do include both yeasts and bacteria, thus necessitating the use of both a fungistatic chemical and a bacteriostatic chemical. The subject matter of the instant invention is directed to the employment of a single organic compound which is both fungistatic and bacteriostatic.

The prime purpose of the instant invention is to eliminate pasteurization. A further purpose is to preserve finished beer chemically, and more particularly to provide both fungistatic and bacteriostatic protection with a single chemical additament.

It is still a further purpose of this invention to provide a method for preserving finished beer, which method is as effective as pasteurization and yet is neither as costly nor as time-consuming as pasteurization.

The foregoing purposes apply with equal validity to the preservation of bock and lager beer and to ale irrespective of the packaging employed. The method of this invention can be employed for draught consumption as well as for consumption from bottles or cans.

Other and further objects of the present invention will appear from the more detailed description set forth below, it being understood that such detailed description is given by way of illustration and explanation only and not by way of limitation, since various changes therein may be made by those skilled in the art without departing from the scope of the present invention.

The compound 2-(1'-oxy-2'-pyridylthio)-imadazoline hydrobromide is extremely water-soluble. This is most unusual for a compound which possesses a high degree of fungistatic activity. Other compounds, such as dehydroacetic acid, U.S. Patent 2,474,229, and benzyl halogen acetates, U.S. Patent 2,842,441, that have been proposed for this use are not sufficiently water-soluble to permit the preparation of a water stock solution. An organic solvent, such as alcohol, must be used for said other compounds. It is, of course, obvious that a water solution for the addition of a substance to a food is preferred.

The compound 2-(1'-oxy-2'-pyridylthio)-imidazoline hydrobromide is prepared, e.g. in the manner set forth in Example II, Belgian Patent No. 565,868, issued September 20, 1958, to Charles Pfizer & Co., Inc. The preparation of other contemplated preservatives is also set forth in said patent. Although the following description is directed specifically to a single compound as the synthetic organic chemical preservative, other acid addition salts of a structure corresponding to Formula 1 can be employed with results similar to those obtained with the specified hydrobromide.

According to the present invention, when, e.g., 2-(1'-oxy-2'-pyridylthio)-imidazoline hydrobromide is employed in an amount so that at least 2.0 parts (by weight) per million (parts by volume) and preferably about 5 parts per million on the same basis, relative to the beer, are added to unpasteurized beer, the inhibition of both bacterial and yeast growth in the beer is at least a great as that achieved by pasteurization.

In addition to the micro-biological preservation discussed above, the instantly contemplated compounds also preserve the fresh flavor of beer. In other words, said compounds tend to prevent or reduce the aging process of the beer.

The effectiveness of these compounds as a beer preservative is evidenced by preparing a series of stock solutions in water so that with the addition of not more than 0.1 ml. of any solution to a test bottle, the desired chemical preservative concentration is obtained when the test bottle (a clean empty standard 12 ounce brown export bottle) is filled with unpasteurized beer and capped on the regular production line. The bottles are incubated at room temperature (about 75° F.) and are compared at weekly intervals with a pasteurized control for the development of sediment. The quantity of sediment is determined visually; values from 1 to 9, based on fixed sediment standards, being assigned to the various degrees of sediment formation. All of the tests are preferably run in triplicate.

The pasteurized beer which is used is free from all viable micro-organisms. The secondary yeast count in the unpasteurized beer is of the order of 10–100 cells/ml. and the bacterial count is extremely low (a few per ml.).

TABLE I

| Concentration of Preservative, parts per million | Sediment Formed After— | | | | | |
|---|---|---|---|---|---|---|
| | 3 weeks | 4 weeks | 6 weeks | 8 weeks | 12 weeks | 18 weeks |
| 0 | 2-3-9+ | 9+-9+-9+ | 9+-9+-9+ | 9+-9+-9+ | 9+-9+-9+ | 9+-9+-9+ |
| 0.1 | 2-3-3 | 3-4-9+ | 9+-9+-9+ | 9+-9+-9+ | 9+-9+-9+ | 9+-9+-9+ |
| 0.2 | 2-2-2 | 2-3-3 | 6-6-9+ | 9+-9+-9+ | 9+-9+-9+ | 9+-9+-9+ |
| 0.5 | 2-2-2 | 2-3-5 | 5-5-9+ | 9+-9+-9+ | 9+-9+-9+ | 9+-9+-9+ |
| 1.0 | 1-1-1 | 2-2-2 | 2-3-4 | 9+-9+-9+ | 9+-9+-9+ | 9+-9+-9+ |
| 2.0 | 1-1-1 | 2-2-2 | 2-2-2 | 2-3-3 | 3-3-3 | 4-5-6 |
| 5.0 | 1-1-1 | 2-2-2 | 2-2-2 | 3-3-4 | 3-4-4 | 5-5-6 |
| Pasteurized Control | 1-2-2 | 2-2-2 | 2-2-3 | 3-3-4 | 3-4-4 | 6-6-6 |

Employing the foregoing procedure, the data of Table I are obtained using as the preservative 2-(1'-oxy-2'-pyridylthio)-imidazoline hydrobromide. These data illustrate the degree of preservation both in relation to the pasteurized control and the unpasteurized sample to which no chemical was added.

In the following specific examples beer which is produced by bottom fermentation is referred to as lager beer. The relationship of parts by weight to parts by volume is the same as the relationship of grams to milliliters. Throughout the instant disclosure all references to "parts per million" are directed to parts (by weight) per million parts (by volume) as explained above.

*Example I*

Into a clean empty standard 12 ounce brown export bottle is placed 0.1 milliliter (ml.) of an aqueous (water) solution of 2-(1'-oxy-2'-pyridylthio)-imidazoline hydrobromide. The concentration of this chemical preservative in the aqueous solution is 0.007 part by weight per part by volume.

The brown export bottle with the added chemical preservative is then filled with unpasteurized beer and capped on the regular production line. In this example 350 ml. of unpasteurized, lager beer are placed in the bottle prior to capping. The concentration of preservative in the capped bottle is 2 parts (by weight) of preservative per million parts (by volume) of beer.

This bottle of lager beer, maintained at room temperature (75° F.) for as long as 18 weeks, does not form an excess of sediment.

*Example II*

Into a clean empty standard 12 ounce brown export bottle is placed 0.1 ml. of an aqueous solution of 2-(1'-oxy-2'-pyridylthio)-imidazoline hydrobromide. The concentration of this chemical preservative in the aqueous solution is 0.0175 part by weight per part by volume.

The brown export bottle containing the added preservative is then filled with unpasteurized beer and capped on the regular production line. In this example 350 ml. of unpasteurized lager beer are placed in the bottle prior to capping. The concentration of preservative in the capped bottle is 5 parts (by weight) of preservative per million parts (by volume) of unpasteurized beer.

This bottle of lager beer (with added preservative), maintained at room temperature (75° F.) for as long as 18 weeks, does not form an excess of sediment.

*Example III*

Into a clean standard half-barrel (about fifteen-and-one-half-gallon container) is placed 0.57 ounce of an aqueous solution of 2-(1'-oxy-2'-pyridylthio)-imidazoline hydrobromide. The concentration of this chemical preservative is 0.007 part by weight per part by volume of aqueous solution.

The half-barrel containing the aqueous preservative solution is then filled with fifteen-and-one-half gallons of unpasteurized lager beer and sealed on the regular production line. The concentration of the chemical preservative in the sealed half-barrel is 2 parts (by weight) of preservative per million parts (by volume) of beer.

This half-barrel of beer (containing added preservative), maintained at a temperature of 75° F. for as long as 18 weeks, does not form an excessive amount of sediment.

All of the preceding examples have been directed to the use of 2-(1'-oxy-2'-pyridylthio)-imidazoline hydrobromide as the preservative. It is understood, however, that other acid addition salts of compounds of the general Formula 1, employed in the same manner as set forth in Examples I to III, yield corresponding results. More specifically, 2 - (2' - tetrahydropyrimidylmercapto) - pyridine-N-oxide hydrobromide, used in place of the specified preservative in Example II, yields similar results. It is further understood that in place of the hydrobromide, other pharmaceutically acceptable acid addition salts, such as the chloride, iodide, sulfate, phosphate, citrate, gluconate and tartrate, give corresponding results. For example, 2-(1'-oxy-2'-pyridylthio) - imidazoline hydrosulfate, substituted for the preservative in Example III, yields results similar to those indicated.

The foregoing are merely exemplary embodiments of the instant invention. It is naturally understood that bock beer, ale, porter and stout can be treated in similar fashion with corresponding results. The invention may be effectively applied to beer which is packaged in ways other than those illustrated, e.g. canned beer.

What we claim is:

1. A method which comprises admixing with finished beer a micro-biological growth inhibiting amount of 2-(1'-oxy-2'-pyridylthio)-imidazoline hydrobromide.

2. A method of inhibiting both the bacterial and the yeast growth in beer by admixing a single synthetic organic chemical with finished beer, said organic chemical being 2-(1'-oxy-2'-pyridylthio)-imidazoline hydrobromide.

3. A method of inhibiting micro-biological growth in beer which comprises admixing with finished beer from 2.0 to 5.0 parts by weight of 2-(1'-oxy-2'-pyridylthio)- imidazoline hydrobromide per million parts by volume of beer.

4. A method of inhibiting micro-biological growth in a member selected from the group consisting of lager beer, bock beer, ale, porter and stout which comprises admixing with said member a micro-biological growth inhibiting amount of 2-(1'-oxy-2'-pyridylthio)-imidazoline hydrobromide.

5. Beer containing a micro-biological growth inhibiting amount of 2-(1'-oxy-2'-pyridylthio)-imidazoline hydrobromide.

6. Beer containing from about 2.0 to about 5.0 parts per million of 2-(1'-oxy-2'-pyridylthio)-imidazoline hydrobromide.

7. Beer containing 2.0 parts by weight of 2-(1'-oxy-2'-pyridylthio)-imidazoline hydrobromine per million parts by volume of beer.

8. Beer containing 5 parts by weight of 2-(1'-oxy-2'-pyridylthio)-imidazoline hydrobromide per million parts by volume of beer.

9. Beer containing a micro-biological growth inhibiting amount of a pharmaceutically acceptable acid addition salt of 2-(1'-oxy-2'-pyridylthio)-imidazoline.

10. Beer containing a micro-biological growth inhibiting amount of a preservative selected from the group consisting of (1) a compound of the formula

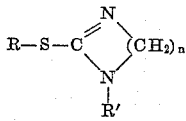

and (2) a pharmaceutically acceptable acid addition salt of said compound; R being a member selected from the group consisting of 2-pyridyl-N-oxide and 2-quinolyl-N-oxide; $n$ being an integer from 2 to 4; and R' being a member selected from the group consisting of hydrogen and alkyl having from 1 to 4 carbon atoms.

11. In a method of inhibiting both the bacterial and the yeast growth in beer by admixing therewith a single synthetic organic chemical, the feature wherein said synthetic organic chemical is a member selected from the group consisting of (1) a compound of the formula

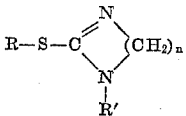

and (2) a pharmaceutically acceptable acid addition salt of said compound; R being a member selected from the group consisting of 2-pyridyl-N-oxide and 2-quinolyl-N-oxide; $n$ being an integer from 2 to 4; and R' being a member selected from the group consisting of hydrogen and alkyl having from 1 to 4 carbon atoms.

12. A method which comprises admixing with finished beer a micro-biological growth inhibiting amount of a preservative selected from the group consisting of (1) a compound of the formula

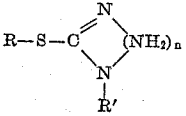

and (2) a pharmaceutically acceptable acid addition salt of said compound; R being a member selected from the group consisting of 2-pyridyl-N-oxide and 2-quinolyl-N-oxide; $n$ being an integer from 2 to 4; and R' being a member selected from the group consisting of hydrogen and alkyl having from 1 to 4 carbon atoms.

13. A method which comprises admixing with finished beer a micro-biological growth inhibiting amount of a preservative of the formula

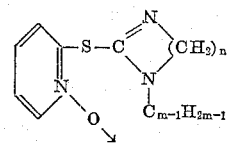

wherein $n$ is an integer from 2 to 4 and $m$ is an integer from 1 to 5.

14. A method which comprises admixing with finished beer a micro-biological growth inhibiting amount of a preservative of the formula

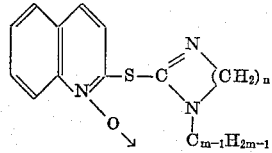

wherein $n$ is an integer from 2 to 4 and $m$ is an integer from 1 to 5.

15. Unpasteurized finished beer admixed with a micro-biological growth inhibiting amount of a pharmaceutically acceptable acid addition salt of a compound of the formula

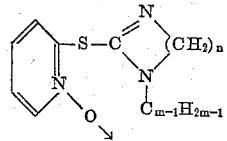

wherein $n$ is an integer from 2 to 4 and $m$ is an integer from 1 to 5.

16. Unpasteurized ale admixed with a micro-biological growth inhibiting amount of a pharmaceutically acceptable acid addition salt of a compound of the formula

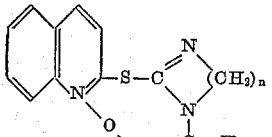

wherein $n$ is an integer from 2 to 4 and $m$ is an integer from 1 to 5.

References Cited in the file of this patent

UNITED STATES PATENTS

| | | |
|---|---|---|
| 2,474,229 | Coleman et al. | June 28, 1949 |
| 2,842,441 | Kuen | July 8, 1958 |
| 2,921,073 | Conover et al. | Jan. 12, 1960 |

FOREIGN PATENTS

| | | |
|---|---|---|
| 565,868 | Belgium | Sept. 20, 1958 |